US011861654B2

(12) United States Patent
Taylor et al.

(10) Patent No.: US 11,861,654 B2
(45) Date of Patent: Jan. 2, 2024

(54) SYSTEM AND METHOD FOR PREDICTING CUSTOMER BEHAVIOR

(71) Applicant: Optimizely North America Inc., Nashua, NH (US)

(72) Inventors: Brian Taylor, White Hall, MD (US); Spencer Eldon Pingry, Leesburg, VA (US); Laura Kreisberg, Reston, VA (US)

(73) Assignee: Optimizely North America Inc., Nashua, NH (US)

( * ) Notice: Subject to any disclaimer, the term of this patent is extended or adjusted under 35 U.S.C. 154(b) by 0 days.

(21) Appl. No.: 17/211,964

(22) Filed: Mar. 25, 2021

(65) Prior Publication Data

US 2021/0312493 A1 Oct. 7, 2021

Related U.S. Application Data

(60) Provisional application No. 62/994,835, filed on Mar. 25, 2020.

(51) Int. Cl.
*G06Q 30/0242* (2023.01)
*G06Q 30/0251* (2023.01)
(Continued)

(52) U.S. Cl.
CPC ........... *G06Q 30/0244* (2013.01); *G06N 3/04* (2013.01); *G06N 3/08* (2013.01); *G06Q 30/0204* (2013.01); *G06Q 30/0254* (2013.01)

(58) Field of Classification Search
None
See application file for complete search history.

(56) References Cited

U.S. PATENT DOCUMENTS 10,824,940 B1 * 11/2020 Rybakov .................. G06N 3/08
11,126,660 B1 * 9/2021 Sen ........................... G06N 3/08
(Continued)

FOREIGN PATENT DOCUMENTS

CN 110570355 A * 12/2019

OTHER PUBLICATIONS

Chen, Kang, Chen, and Wang. Probabilistic Forecasting with Temporal Convolutional Neural Network. Mar. 16, 2020. arXiv. <URL: https://arxiv.org/abs/1906.04397> (Year: 2020).*
(Continued)

*Primary Examiner* — Bion A Shelden
(74) *Attorney, Agent, or Firm* — Toering Patents PLLC (57) ABSTRACT

Various implementations of the invention for predicting customer behavior are described. Various implementations of the invention comprise an embedding component configured to receive and embed sequential inputs regarding a plurality of customer interactions with an online presence of a client; a plurality of causal dilated convolutional "CDC" elements configured to receive the embedded sequential inputs and to output a feature vector, where each CDC element comprises two causal dilated convolutions with regularization that is bypassed with a skip connection; a plurality of dense neural network elements configured to receive the feature vector and non-sequential inputs regarding a plurality of other customer interactions with the client, where each of the plurality of dense neural network elements comprises two dense neural networks with regularization that is bypassed with a skip connection; and an output generator configured to receive the output from the plurality of dense neural network elements and to generate a distribution of times over which a particular customer event will occur and/or a likelihood estimation that the particular customer event will occur within a particular time period.

10 Claims, 9 Drawing Sheets

(51) Int. Cl.
*G06N 3/04* (2023.01)
*G06N 3/08* (2023.01)
*G06Q 30/0204* (2023.01)

(56) References Cited

U.S. PATENT DOCUMENTS

| | | | | |
|---|---|---|---|---|
| 11,415,975 | B2* | 8/2022 | Huang | G05B 23/0254 |
| 2018/0075343 | A1* | 3/2018 | van den Oord | G06N 3/0472 |
| 2019/0065978 | A1* | 2/2019 | Martine | G06N 20/00 |
| 2021/0125073 | A1* | 4/2021 | Keng | G06N 3/0445 |

OTHER PUBLICATIONS

Brownlee. How to Configure an Encoder-Decoder Model for Neural Machine Translation. Mar. 27, 2019. <URL: https://web.archive.org/web/20190327044202/https://machinelearningmastery.com/configure-encoder-decoder-model-neural-machine-translation/> (Year: 2019).*

Srivastava, Hinton, Krizhevsky, Sutskever, and Salakhutdinov. Dropout: a Simple Way to Prevent Neural Networks from Overfitting. JMLR 15(56):1929-1958, 2014. <URL: https://jmlr.org/papers/v15/srivastava14a.html> (Year: 2014).*

Borovykh, Anastasia & Bohte, Sander & Oosterlee, Cornelis. (2017). Dilated Convolutional Neural Networks for Time Series Forecasting. Journal of Computational Finance. 10.21314/JCF.2019.358. (Year: 2017).*

Liu, Chunyang & Liu, Jiping & Shenghua, Xu & Wang, Jian & Liu, Chao & Chen, Tianyang & Jiang, Tao. (2020). A Spatiotemporal Dilated Convolutional Generative Network for Point-of-Interest Recommendation. ISPRS International Journal of Geo-Information. 9. 113. 10.3390/ijgi9020113. (Year: 2020).*

K. He et al. Identity Mappings in Deep Residual Networks. arXiv. Jul. 25, 2016. [retrieved from arXiv on Jun. 27, 2022] <URL: https://arxiv.org/pdf/1603.05027.pdf> (Year: 2016).*

M Nauta et al. Causal Discovery with Attention-Based Convolutional Neural Networks. Jan. 7, 2019. Mach. Learn. Knowl. Extr.[ retrieved from internet on Jan. 11, 2023] <URL: https://www.mdpi.com/2504-4990/1/1/19> (Year: 2019).*

J Naranjo-Alcazar et al. On the performance of residual block design alternatives in convolutional neural networks for end-to-end audio classification. Sep. 26, 2019. arXiv. [retrieved from the internet on Jan. 11, 2023] <URL: https://arxiv.org/pdf/1906.10891.pdf> (Year: 2019).*

P Chen et al. Weighted sequence loss based recurrent model for repurchase recommendation. 2019. IOP Conf. Ser .: Mater. Sci. Eng. [retrieved on Aug. 7, 2023] <URL: https://iopscience.iop.org/article/10.1088/1757-899X/490/6/062062/pdf> (Year: 2019).*

* cited by examiner

LIFECYCLE STAGES 310

BUYING CYCLE STAGES 320

DEVICES 330

CHANNELS 340

PRODUCT CATEGORY NAME 350

SYSTEM AND METHOD FOR PREDICTING CUSTOMER BEHAVIOR

CROSS-REFERENCE TO RELATED APPLICATIONS

This application claims priority to U.S. Provisional Application No. 62/994,835, filed on Mar. 25, 2020, and titled "System and Method for Predicting Customer Behavior." Each of the foregoing application(s) is incorporated herein by reference in their entirety.

FIELD OF THE INVENTION

The invention is generally related to computer learning and more particularly to predicting certain customer events in an online environment.

BACKGROUND OF THE INVENTION

Various conventional data storage systems attempt to track and monitor a user's interactions with a website in order to ascertain certain behavior of the user, including, but not limited to buying behavior of a customer. However, these conventional data storage systems typically fail to acquire sufficient data at a proper level of granularity to understand and properly analyze such user interactions.

What are needed are systems and methods for storing and retrieving data, and then predicting user behavior based on that data. What are further needed are such systems that are designed to organize and analyze such data in a manner that permits influence of such user behavior.

SUMMARY OF THE INVENTION

Various implementations of the invention may determine a parameter (e.g., time, etc.) and/or associated likelihood for a particular desired event to occur in an online environment. While this description refers to such desired event as an "order," the invention is not so limited and may apply to any desired event as would be appreciated.

Various implementations of the invention collect and store a detailed stream of user interactions with a client's presence in an electronic or online environment ("online presence"). These interactions include user activity, product details, promotional details, content details, etc. Various implementations of the invention build a model tailored to each client that is unique to the types of users the client attracts and the event activity that those users generate.

Generally speaking, various implementations of the invention model unique interactions (e.g., event types), products, user acquisition strategies, and consideration times of users as they interact with the client to learn which events or sequences of events for which types of users tend to lead to a conversion (e.g., order) or other desired event.

Various implementations of the invention for predicting user behavior are described. Various implementations of the invention for predicting customer behavior are described. Various implementations of the invention comprise an embedding component configured to receive and embed sequential inputs regarding a plurality of customer interactions with an online presence of a client; a plurality of causal dilated convolutional "CDC" elements configured to receive the embedded sequential inputs and to output a feature vector, where each CDC element comprises two causal dilated convolutions with regularization that is bypassed with a skip connection; a plurality of dense neural network elements configured to receive the feature vector and non-sequential inputs regarding a plurality of other customer interactions with the client, where each of the plurality of dense neural network elements comprises two dense neural networks with regularization that is bypassed with a skip connection; and an output generator configured to receive the output from the plurality of dense neural network elements and to generate a distribution of times over which a particular customer event will occur and/or a likelihood estimation that the particular customer event will occur within a particular time period.

These and other implementations of the invention, and their respective features, are described in further detail below.

DETAILED DESCRIPTION

Various implementations of the invention may utilize and operate in connection with a data storage system provided by Zaius, Inc., of Leesburg, Va. and as described in: U.S. patent application Ser. No. 14/562,610, filed on Dec. 5, 2014 and entitled "System and Method for Storing and Retrieving Data in Different Data Spaces;" U.S. patent application Ser. No. 14/562,611, filed on Dec. 5, 2014 and entitled "System and Method for Creating Storage Containers in a Data Storage System;" and U.S. patent application Ser. No. 14/562,612, filed on Dec. 5, 2014 and entitled "System and Method for Load Balancing in a Data Storage System." Each of the foregoing applications is incorporated herein by reference.

Figure 1:
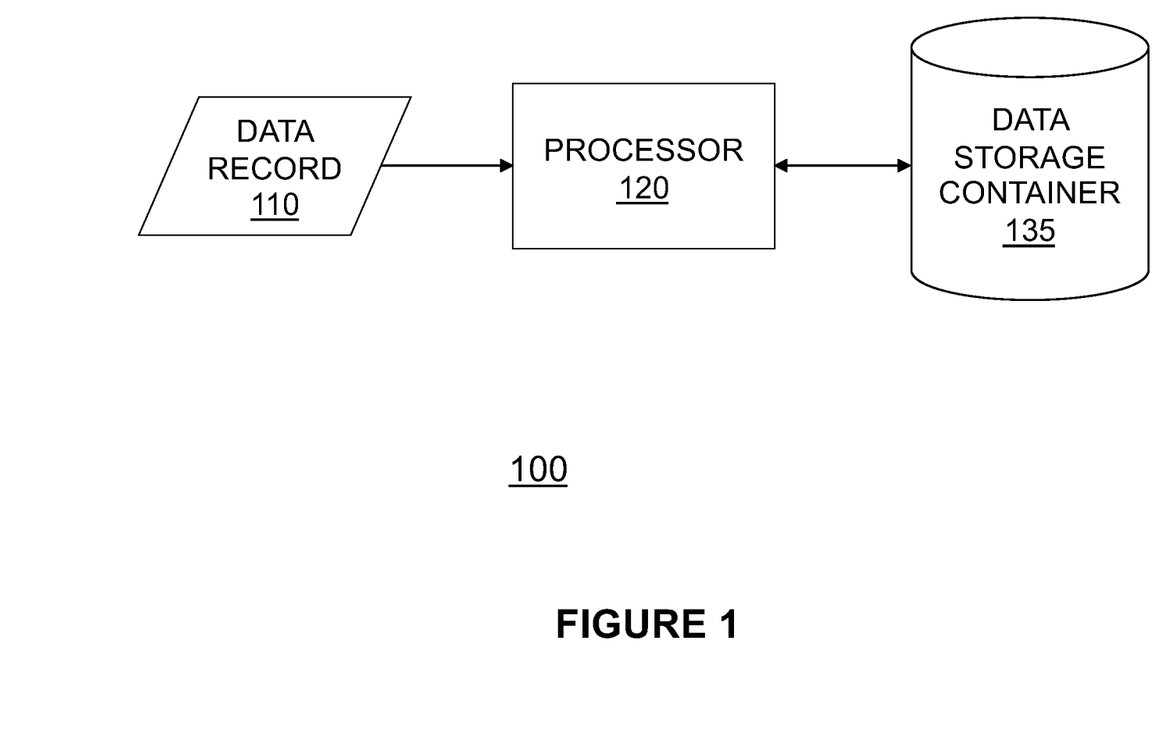
FIG. 1 illustrates a data storage system according to various implementations of the invention.

FIG. 1 illustrates a data storage system 100 according to various implementations of the invention. Data storage system 100 includes a processor 120 and at least one data storage container 135. According to various implementations of the invention, a data record 110 is stored in data storage container 135. Data storage container 135 corresponds to a logical data storage element which may be stored on one or more physical data storage assets (not otherwise illustrated in FIG. 1). According to various implementations of the invention, physical data storage assets may include, but are not limited to servers, disks, memories, other non-transitory computer readable media, or other physical data storage assets including banks or farms of such physical data storage assets.

According to various implementations of the invention, processor 120 may be any general purpose hardware computing processor configured via various executable programming instructions stored internally to or externally from processor 120 in a computer readable medium, where when such programming instructions are executed by the computing processor, they cause the computing processor to perform various functions as would be appreciated. When configured with such programming instructions, the general purpose hardware computing processor becomes a particular processor that performs functions attributed to processor 120 as described herein. According to various implementations of the invention, processor 120 may be a single hardware computing processor or a plurality of hardware computing processors. According to various implementations of the invention, processor 120 may be a dedicated hardware computing processor configured to perform various functions of processor 120 as described herein or a plurality of hardware computing processors distributed throughout data storage system 100, each configured to perform one or more of the functions of processor 100 as described herein.

Figure 2:
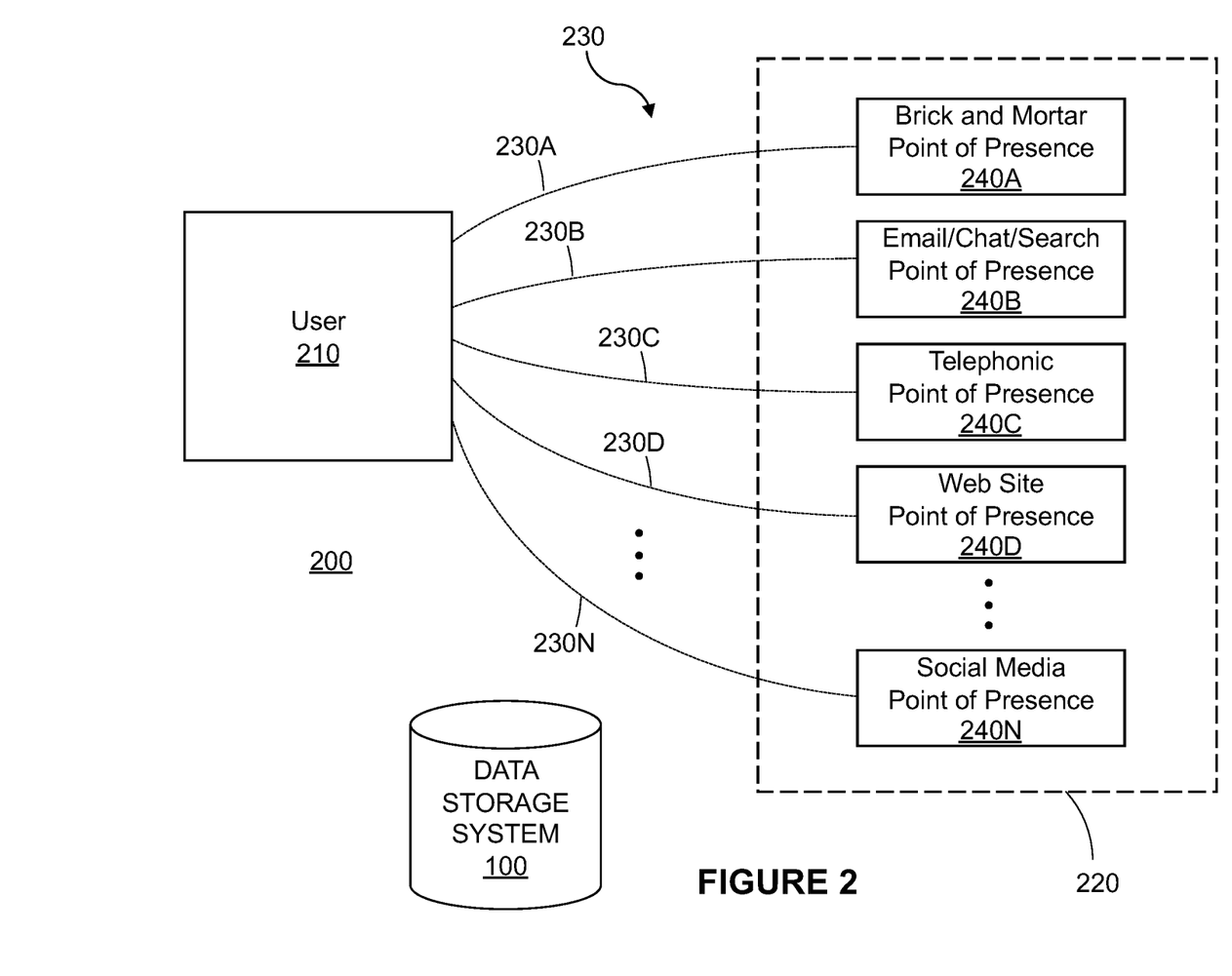
FIG. 2 illustrates an environment in which various implementations of the invention operate.

According to various implementations of the invention, data storage system 100 may be used in an environment 200 as illustrated in FIG. 2 to acquire and store various interactions 230 (illustrated as an interaction 230A, an interaction 230B, an interaction 230C, an interaction 230D, . . . , and an interaction 230N) between a customer 210 (also referred to as a "user" herein) and a seller 220 (also referred to as a "client" herein). As illustrated, seller 220 may have one or more point of presence 240 (illustrated as a point of presence 240A, a point of presence 240B, a point of presence 240C, a point of presence 240D, . . . , and a point of presence 240N) within environment 200. Points of presence 240 may correspond to physical points of presence, or to electronic points of presences. Points of presence 240 may sometimes also be referred to as channels. For example, as illustrated, customer 210 may interact in person with seller 220 via a bricks-and-mortal store point of presence 240A during interaction 230A or telephonically with seller 220 via a customer service representative point of presence 240C during interaction 230C; or customer 210 may interact electronically with seller 220 via a website point of presence 240D during interaction 230D or an email/chat/search point of presence 240B during interaction 230B; or customer 210 may interact directly or indirectly with seller 220 via social media point of presence 240N during interaction 230N. Customer 210 may interact with seller 220 in other manners and/or via other points of presence 240 during other interactions 230 as would be appreciated. According to various implementations of the invention, data storage system 100 acquires and stores each interaction 230 between customer 210 and seller 220; in some implementations of the invention, such interactions 230 are acquired and stored in real time.

According to various implementations of the invention, various pieces of information (e.g., data) regarding each interaction 230 between customer 210 and seller 220 may be gathered, generated, or otherwise acquired. Such information may include, but is not limited to, information describing customer 210, seller 220, point of presence 240, etc., and interaction 230, itself, including, but not limited to, date, time, products or services viewed/selected/purchased, origin, etc. As would be appreciated, any information that can be gleaned regarding customer 210, seller 220, point of presence 240 and interaction 230 may be stored as data records in a data store.

According to various implementations of the invention, customers 210 may be organized into categories (i.e., categorized) based on an entirety of their respective interactions 230 with seller 220. Such categories are referred to herein as "lifecycle stages" and describe a nature of a relationship between each of customers 210 and seller 220. According to various implementations of the invention, customers 210 may be organized into different lifecycle stages based on a number of products or services purchased during their respective entirety of interactions 230 with seller 220. Such lifecycle stages may include: a "no purchaser" lifecycle stage which includes customers 210 that have interacted with seller 220 but have not ever purchased a product or service from seller 220; a "single purchaser" lifecycle stage which includes customers 210 that have interacted with seller 220 and have exactly one purchase transaction (a purchase transaction may include multiple products or services purchased during such transaction) with seller 220; a "repeat purchaser" lifecycle stage which includes customers 210 that have interacted with seller 220 and have exactly two purchase transactions with seller 220; and a "loyal purchaser" lifecycle stage which includes customers 210 that have interacted with seller 220 and have three or more purchase transactions with seller 220. Fewer, more or other lifecycle stages and/or other definitions of such lifecycle stages may be used as would be appreciated.

According to various implementations of the invention, customers 210 may be organized into different lifecycle stages based on revenue generated from their respective entirety of interactions 230 with seller 220. Such lifecycle stages may include: a "$0 revenue" lifecycle stage which includes customers 210 that have interacted with seller 220 but have not purchased any products or services from seller 220; a "$0-$50" lifecycle stage which includes customers 210 that have interacted with seller 220 and have purchased $0-$50 worth of products or services from seller 220; a "$50-$200" lifecycle stage which includes customers 210 that have interacted with seller 220 and have purchased $50-$200 worth of products or services from seller 220; and a "$200+" lifecycle stage which includes customers 210 that have interacted with seller 220 and have purchased $200 or more worth of products or services from seller 220. More generally, such lifecycle stages may include: a "$0 revenue" lifecycle stage which includes customers 210 that have interacted with seller 220 but have not purchased any products or services from seller 220; a "$0-$X_1$" lifecycle stage which includes customers 210 that have interacted with seller 220 and have purchased $0-$X_1$ worth of products or services from seller 220; a "$X_1$-$X_2$" lifecycle stage which includes customers 210 that have interacted with seller 220 and have purchased $X_1$-$X_2$ worth of products or services from seller 220; and a "$X_2$+" lifecycle stage which includes customers 210 that have interacted with seller 220 and have purchased $X_2$ or more worth of products or services from seller 220 (where $X_2 > X_1 > 0$. Fewer, more or other revenue-based lifecycle stages and/or other definitions of such revenue-based lifecycle stages may be used as would be appreciated.

According to various implementations of the invention, customers 210 may be organized into lifecycle stages based on level or frequency/period of engagement with seller 220. Such lifecycle stages may include: an "customer engages quarterly" lifecycle stage which includes customers 210 that have interacted with seller 220 within a quarterly period; an "customer engages monthly" lifecycle stage which includes customers 210 that have interacted with seller 220 within a monthly period; an "customer engages weekly" lifecycle stage which includes customers 210 that have interacted with seller 220 within a weekly period; and an "customer engages daily" lifecycle stage which includes customers 210 that have interacted with seller 220 within a daily period. More generally, such lifecycle stages may include: an "customer engages within a first period" lifecycle stage which includes customers 210 that have interacted with seller 220 within the first period; an "customer engages within a second period" lifecycle stage which includes customers 210 that have interacted with seller 220 within the second period; etc. (where the first period is greater than the second period, etc.). Fewer, more or other engagement-based lifecycle stages and/or other definitions of such engagement-based lifecycle stages may be used as would be appreciated.

According to various implementations of the invention, customers 210 may be organized into lifecycle stages based on a purchase frequency from seller 220. Such lifecycle stages may include: a "purchases annually" lifecycle stage which includes customers 210 that have interacted with seller 220 and purchased products or services within an annual period; a "purchases quarterly" lifecycle stage which includes customers 210 that have interacted with seller 220 and purchased products or services within a quarterly period; a "purchases monthly" lifecycle stage which includes customers 210 that have interacted with seller 220 and purchased products or services within a monthly period; a "purchases weekly" lifecycle stage which includes customers 210 that have interacted with seller 220 and purchased products or services within a weekly period. Fewer, more or other engagement-based lifecycle stages and/or definitions of such purchase-based lifecycle stages may be used as would be appreciated.

According to various implementations of the invention, customers 210 may be organized (or further organized) into categories based on a nature of their interactions 230 with seller 220, referred to herein as "buying cycle stages." These buying cycle stages may include: an "at risk" buying cycle stage which includes customers 210 that have not interacted with seller 220 across any channel for more than 30 days; a "recent buyer" buying cycle stage which includes customers 210 that purchased a product or service within 30 days but have not since interacted with seller 220; an "awareness" buying cycle stage which includes customers 210 that interacted with seller 220 within 30 days; an "interest" buying cycle stage which includes customers 210 that have shown a basic level of interest in a product or service by, for example, interacting with such product or service by viewing a product page, etc.; a "considering" buying cycle stage which includes customers 210 that have shown a further interest in a product or service by, for example, interacting with such product or service by viewing a same product page twice, etc.; and an "intent" buying cycle stage which includes customers 210 that have shown real purchase intent by, for example, placing a product or service in a shopping cart, etc. Fewer, more or other buying cycle stages and/or definitions or periods of such buying cycle stages may be used as would be appreciated.

In some implementations of the invention, customers 210 categorized into each lifecycle stage may be further categorized into one of the buying cycle stages. In some implementations of the invention, customers 210 categorized into each buying cycle stage may be further categorized into one of the lifecycle stages. In some implementations of the invention, the plurality of lifecycle stages are mutually exclusive from one another; that is a given customer does not simultaneously exist in two different lifecycle stages with a given seller. In some implementations of the invention, the plurality of buying cycle stages are mutually exclusive from one another; that is, a given customer does not simultaneously exist in two different buying cycle stages with a given seller.

According to various implementations of the invention, each of the lifecycle stages and/or buying cycle stages may be further categorized into various dimensions based on the various information gathered, generated, and/or acquired regarding interaction 230. Such dimensions may include, but are not limited to: an average order value ("AOV") dimension; a cost per click ad type dimension; a region (e.g., state, etc.) dimension; a country dimension; a postal code dimension; a mobile device dimension; a page duration dimension; a session duration dimension; an operating system dimension; a browser dimension; a page title dimension; an advertising referral source dimension; a keyword search term referral dimension; an original advertising source of a customer session dimension; an advertising source related to specific customer session dimension; a language dimension; a days since last visit dimension; a landing page dimension; an advertising campaign dimension; a device type dimension; an on-site or in-app search term dimension; a product ID dimension; a product brand dimension; an hour dimension; a day dimension; a week dimension; a hour of day dimension; a day of week dimension; a quantity of products purchased dimension; a navigation used dimension; a product name dimension; an order timestamp dimension; an order ID dimension; an order number dimension; an order discount dimension; an order coupon code dimension; a purchase count dimension; a customer browsed dimension; a customer viewed dimension; a customer added to cart dimension; a customer removed from cart dimension; a customer purchased dimension; a root category dimension; a product detail view dimension; and/or other dimension related to customer 210, to their interaction(s) 230 with seller 220, to seller 220, and/or products or services offered by seller 220.

According to various implementations of the invention, a value of a given dimension in a corresponding lifecycle stage and/or buying cycle stage is calculated based on the value of that dimension within that given stage. For example, if a customer 210 has a mobile device interaction 230 with seller 220 as a "no purchaser" and then subsequently has a desktop interaction 230 with seller 220 in its current stage as a "single purchaser," then only the desktop interaction 230 is counted in the current stage. Further, any purchase dimensions (i.e., dimensions describing or relating to a product or service purchased) are calculated based on the particular purchase that moved customer 210 into its current stage. Still further, showing a "root category purchased" will present root categories of the products or services originally purchased by customer 210.

According to various implementations of the invention, lifecycle stages, buying cycle stages, and dimensions are individually configurable and individually selectable. Any such selections made may then be applied as filters to data records 110 in data storage system 100. In some implementations of the invention, identifying information (e.g., customer ID, phone number, email address, user name, customer loyalty program number, or other contact and/or identifying information, etc.) may be presented for each customer 210 that complies with such selections (referred to herein as a "filter segment"). In some implementations of the invention, the user may then select a given customer 210 in the filter segment to visualize data records 110 that justifies including the given customer 210 in the filter segment. In some implementations of the invention, the user may select a given filter segment in its entirety, and export it for use with a targeted marketing campaign. In some implementations of the invention, each of the customers 210 in the exported filter segment may be provided with target advertising. In some implementations, because the underlying data is collected and made available for analysis in real-time, the filter segment corresponds to an "up-to-the-minute" snapshot of customers 210 that match the various selected criteria.

According to various implementations of the invention, once customers 210 are categorized into either lifecycle stages and/or buying cycle stages, various metrics for each particular stage may be determined and presented to a user. Such metrics may include: a "number of customers" metric that measures a number of customers 210 in that particular stage; a "percentage of customers" metric that measures the number of customers 210 in that particular stage as a percentage of a total number of customers across all stages; a "total revenue" metric that measures a total amount of revenue of products or services purchased from seller 220 by customers 210 in that particular stage; a "percentage convert" metric that measures the total number of customers 210 in more valuable stages divided by the sum of the number of customers in the particular stage and the total number of customers 210 in the more valuable stages (e.g., for a single purchase cycle stage the percentage convert metric is determined by (number of customers 210 in the repeat purchaser lifecycle stage plus the number of customers 210 in the loyal lifecycle stage) divided by (number of customers 210 in the single purchaser lifecycle stage plus number of customers 210 in the repeat purchaser lifecycle stage plus the number of customers 210 in the loyal lifecycle stage)); a "days to covert" metric that measures a number of days a customer (or average number of days for a group of customers) was in a particular stage before advancing to a next more valuable stage; an "AOV" or "average order value" metric that measures a total value of all purchases of a product or service by customers 210 in that particular stage divided by the number of customers 210 in that particular stage. As would be appreciated, a user may configure which of the metrics to determine and/or display.

Similarly, according to various implementations of the invention, once customers 210 are categorized into either lifecycle stages and/or buying cycle stages, various metrics for each of one or more dimensions may be determined and presented to a user as will become apparent from the example below.

Figure 3:
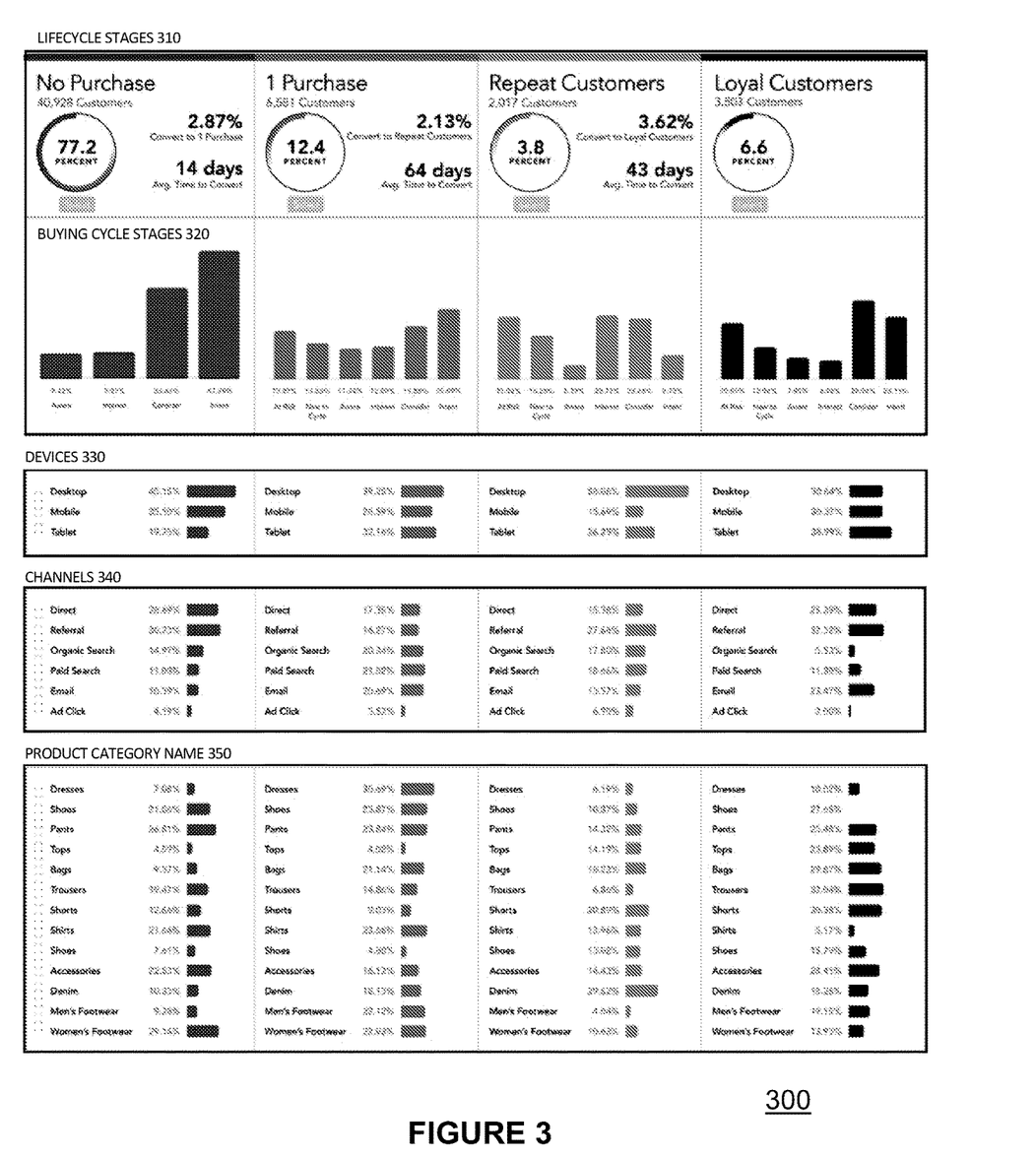
FIG. 3 illustrates an example graphic user interface according to various implementations of the invention.
Figure 4A:
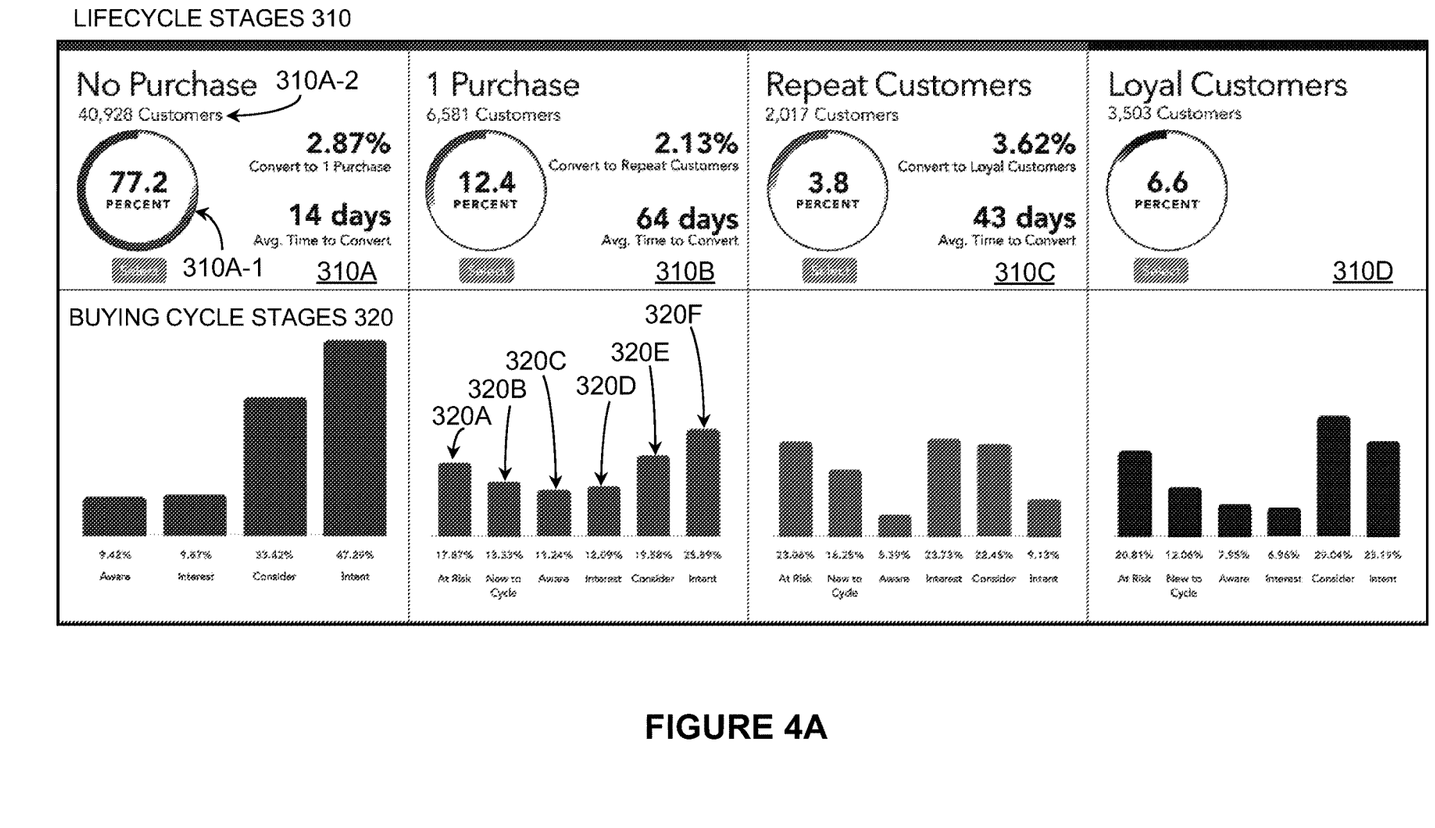
FIGS. 4A and 4B illustrate portions of FIG. 3 in further detail.
Figure 4B:
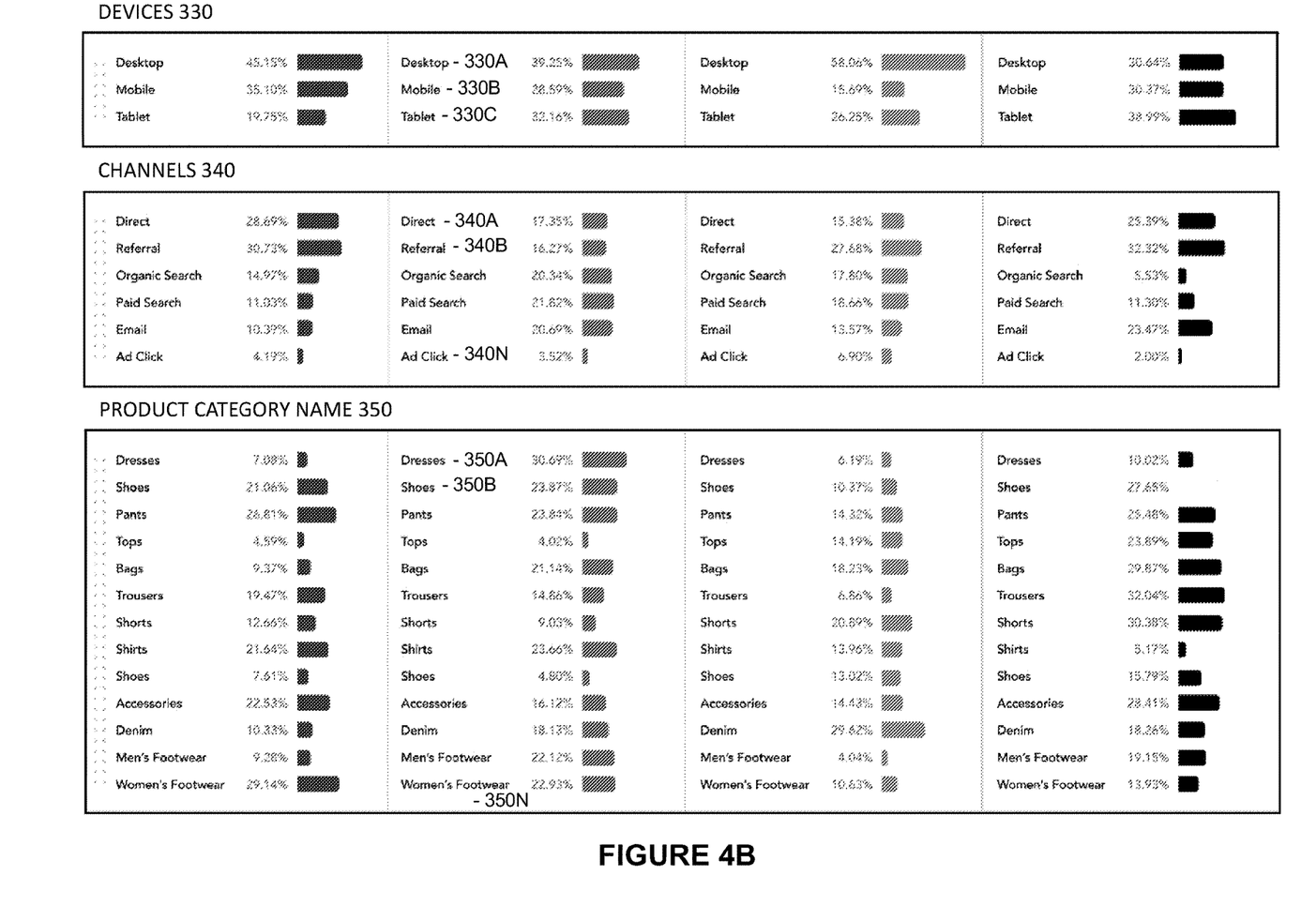

FIG. 3 illustrates an exemplary graphical user interface 300 that may be used in various implementations of the invention to display various customer behavior metrics to a user. FIGS. 4A and 4B illustrate aspects of FIG. 3 in further detail. These Figures are now described. Interface 300 includes a plurality of lifecycle stages 310 (illustrated in FIG. 4A as: a "no purchase" lifecycle stage 310A, a "1 purchase" lifecycle stage 310B, a "repeat customer" lifecycle stage 310C, and a "loyal customer" lifecycle stage 310D); a plurality of buying cycle stages 320 (illustrated in FIG. 4A as: an "at risk" buying cycle 320A, a "new to cycle" buying cycle 320B, an "aware" buying cycle 320C, an "interest" buying cycle 320D, an "consider" buying cycle 320E, and an "intent" buying cycle 320F); and a plurality of dimension groups (illustrated in FIG. 3 as: a "device" dimension group 330; a "channels" dimension group 340, and a "product category" dimension 350).

As illustrated in FIG. 3, customers 210 are categorized first in one of the plurality of lifecycle stages 310 based on their respective interactions 230. Then, the customers 210 in each of lifecycle stages 310 are then further categorized into one of the plurality of buying cycle stages 320, also based on their respective interactions 230. According to various implementations of the invention, all customers 210 are categorized into a single lifecycle stage 310 and further categorized into a single buying cycle stage 320. In some implementations of the invention (not otherwise illustrated), customers 210 may be categorized first in one of the plurality of buying cycle stages 320 based on their respective interactions 230; then, the customers 210 in each of buying cycle stage 320 are then further categorized into one of the plurality of lifecycle stages 310.

In some implementations of the invention, various metrics regarding customer 210 may be provided in interface 300. As illustrated in FIGS. 3 and 4A, a number of customers in each lifecycle stage 310 may be displayed (e.g., a number of customers 310A-2 in "no purchase" stage 310A) along with a percentage that such customers represent across those from all lifecycle stages 310 (e.g., a percentage of customers 310A-1 in "no purchase" stage 310A). For this example, 40,928 customers are in "no purchase" lifecycle stage 310A which represents 77.2% of all customers 210 interacting with seller 220; 6,581 customers are in "one purchase" lifecycle stage 310B which represents 12.4% of all customers 210 interacting with seller 220; 2,017 customers are in "repeat customer" lifecycle stage 310C which represents 3.8% of all customers 210 interacting with seller 220; and 3,503 customers are in "loyal customer" lifecycle stage 310D which represents 6.6% of all customers 210 interacting with seller 220. Various graphic elements may be used to depict such numbers and/or such percentages as would be appreciated.

As further illustrated in FIGS. 3 and 4A, for each lifecycle stage 310, a number of customers in each buying stage 320 may be quantified and displayed. For example, for "one purchase" lifecycle stage 310B, customers 210 are categorized into buying cycles 320. As illustrated, 17.87% of customers in "one purchase" lifecycle stage 310B are categorized in "at risk" buying cycle stage 320A; 13.33% of customers in "one purchase" lifecycle stage 310B are categorized in "new to cycle" buying cycle stage 320B; 11.24% of customers in "one purchase" lifecycle stage 310B are categorized in "aware" buying cycle stage 320C; 12.09% of customers in "one purchase" lifecycle stage 310B are categorized in "interest" buying cycle stage 320D; 19.58% of customers in "one purchase" lifecycle stage 310B are categorized in "consider" buying cycle stage 320E; and 25.89% of customers in "one purchase" lifecycle stage 310B are categorized in "intent" buying cycle stage 320F. Various graphic elements (as illustrated, a bar graph or histogram) may be used to depict such numbers and/or such percentages as would be appreciated.

As also illustrated in FIGS. 3 and 4A-B, once customers 210 are categorized first in one of the plurality of lifecycle stages 310, customers 210 in each of the plurality of lifecycle stages 310 may be further categorized into one or more dimension groups. For example, as illustrated in FIGS. 3 and 4A-B, customers 210 in "one purchase" lifecycle stage 310B are further categorized into a device dimension group 330 (illustrated as a "desktop" device group 330A, a "mobile" device group 330B, and a "tablet" device group 330C). Device dimension group 330 reflects a device type by which customer 210 interacted with seller 230. In this example, 39.25% of customers 210 in lifecycle stage 310B used a desktop device to interact with seller 230; 28.59% of customers 210 in lifecycle stage 310B used a mobile device to interact with seller 230; and 32.16% of customers 210 in lifecycle stage 310B used a tablet device to interact with seller 230.

As also illustrated in FIGS. 3 and 4A-B, customers 210 in "one purchase" lifecycle stage 310B are also further categorized into a channel dimension group 340 (illustrated as a "direct" channel group 340A, a "referral" channel group 340B, an "organic search" channel group, a "paid search" channel group, an "email" channel group, . . . , and an "ad click" channel group 340N). Channel dimension group 340 reflects a channel (or point of presence 230) through which customer 210 interacted with seller. In this example, 17.35% of customers 210 in lifecycle stage 310B used a direct channel to interact with seller 230; 16.27% of customers 210 in lifecycle stage 310B used a referral channel to interact with seller 230; 20.34% of customers 210 in lifecycle stage 310B used an organic search channel to interact with seller 230; 21.82% of customers 210 in lifecycle stage 310B used a paid search channel to interact with seller 230; 20.69% of customers 210 in lifecycle stage 310B used an email channel to interact with seller 230; and 3.52% of customers 210 in lifecycle stage 310B used an ad-click channel to interact with seller 230.

As also illustrated in FIGS. 3 and 4A-B, customers 210 in "one purchase" lifecycle stage 310B are also further categorized into a product category dimension group 350 (illustrated as a "dresses" product category group 350A, a "shoes" product category group 350B, a "pants" product category group, a "tops" product category group, a "bags" product category group, a "trousers" product category group, a "shorts" product category group, a "shirts" product category group, a "shoes" product category group, an "accessories" product category group, a "denim" product category group, a "men's footwear" product category group, . . . , and a "women's footwear" product category group 350N). FIG. 4B illustrates the breakdown of customers 210 that interacted with various product categories of seller 220. As would be appreciated, each customer 210 may interact with multiple products during a particular interaction 230, which is why the sum of the percentages does not equal 100.

For each of dimension groups 330, 340, 350, various graphic elements (as illustrated, a bar graph or histogram) may be used to depict values (e.g., numbers, percentages, etc.) as would be appreciated.

According to various implementations of the invention, the user may select numbers, percentages, or graphic elements in each lifecycle stage 310 or buying cycle stage 320 or dimensions 330, 340, 350 to display information regarding one or more customers 210. In some implementations, this information may include, but is not limited to, identifying information for such customers 210.

In some implementations of the invention, the user may export such identifying information as a contact list for a targeted advertising campaign. In some implementations of the invention, the user may use such identifying information to provide targeted advertising to such customers 210. In some implementations, the targeted advertising may include sending email marketing to such customers 210, pushing mobile notifications to such customers 210, providing in-app (e.g., social media, etc.) messages to such customers 210, delivering targeted web site messages to such customers 210, or other target advertising. For example, the user may cause an email or mobile message associated with the targeted advertising to be sent to one or each of the customers 210 in a given lifecycle and/or buying cycle stage or dimension as would be appreciated; in some implementations, such emails or messages may be tailored based on customers 210 stage(s) or dimension(s) as would be appreciated. As another example, different customers may be provided with different advertisements that get displayed on ad-network or social network based on customers 210 stage(s) or dimension(s). Other mechanisms and bases for targeted advertising may be used as would be appreciated.

In some implementations of the invention, the user may select an individual customer 210 to display any and all information regarding interactions 230 between customer 210 and seller 220. Such information may include, but is not limited to, dates, times, and durations of such interactions, lifecycle stage, buying cycle stage, date of purchases, date of first interaction, date of last interaction, product categories viewed, device types used, channels used, and/or any other dimension associated with customer 210 and its interactions 230 with seller 220.

Figure 5:
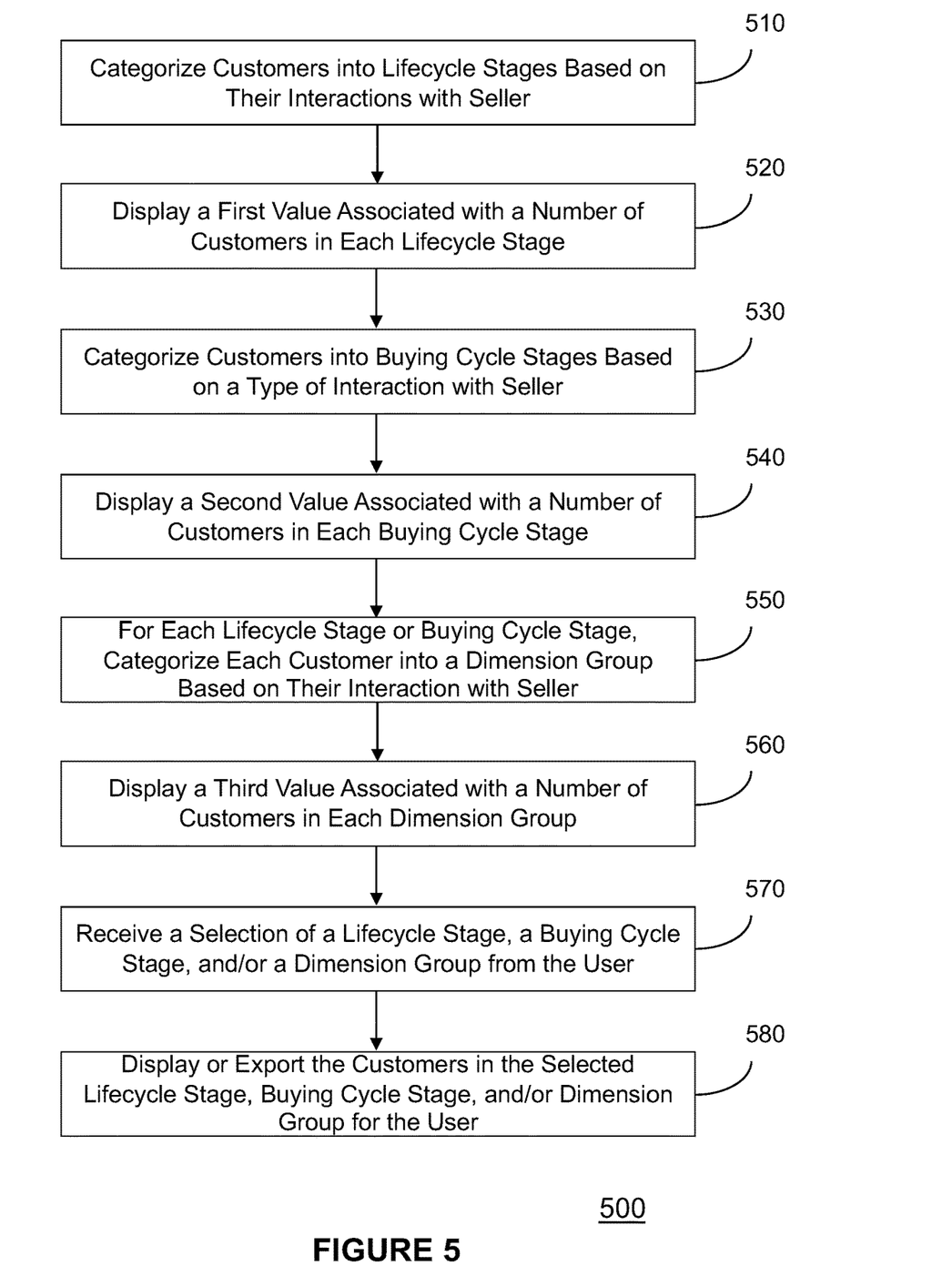
FIG. 5 illustrates an operation of the invention according to various implementations of the invention.

FIG. 5 illustrates an operation 500 of various implementations of the invention. In an operation 510, a plurality of customers 210 are categorized into one of a plurality of lifecycle stages 310 based on one or more interactions of each of the plurality of customers with a seller. In an operation 520, a first value associated with each of the plurality of lifecycle stages 310 is displayed to the user, where the first value comprises a number of customers 210 in that lifecycle stage 310 or a percentage of the number of customers 210 in that lifecycle stage 310 in relation to a total number of customers 210 across all lifecycle stages 310.

In an operation 530, for each of the plurality of lifecycles stages 310, the customers 210 in that lifecycle stage 310 are further categorized into one of a plurality of buying cycle stages 320 based a type of interaction 230 by those customers 210 with seller 220. In an operation 540, a second value associated with each of the plurality of buying cycle stages 320 is displayed to the user, where the second value comprises a number of customers 210 categorized in that buying cycle stage 320 within the given lifecycle stage 320 or a percentage of the number of customers 210 in that buying cycle stage 320 in relation to a total number of customers 210 within the given lifecycle stage 310.

In an operation 550, for each of the plurality of lifecycle stages 310 (or in some implementations for each of the plurality of buying cycles stages 320), each of the customers in that given lifecycle stage are categorized into one of a plurality of dimension groups based on a type of a dimension characterizing interaction 230 of customer 210 with seller 220. In an operation 560, a third value associated with each of the plurality of dimension groups is displayed to the user, where the third value comprises a number of customers 210 in that dimension group or a percentage of the number of customers 210 in that dimension group in relation to a total number of the customers within all of the dimension groups.

In some implementations of the invention, in operation 570, a selection of one of the plurality of lifecycle stages, one of the plurality of buying cycle stages, and/or one of the plurality of dimension groups is received from the user. In some implementations of the invention, in an operation 580, one or more customers that correspond to the selected lifecycle stage, buying cycle stage, and/or dimension group are displayed or exported to the user. In some implementations of the invention, targeted advertising may be sent, or caused to be sent, to the displayed or exported customers.

According to various implementations of the invention, a predictive behavior model is developed and tuned to unique interaction(s) of each client's customers with the client and the client's sources of data. According to various implementations of the invention, various customer insights may be obtained from the predictive behavior model, including, but not limited to: an engagement rank; an order likelihood attribute, a "days until next order" metric, and/or a discount order rate. The engagement rank corresponds to a ranked list of customers most likely to engage with the client and may be used by the client to solicit product reviews from the customer or to gather feedback from a new product offering(s). The order likelihood attribute may be used by the client to encourage "low-likely" customers to purchase or suppress "unlikely" customers from high-frequency campaigns. According to various implementations of the invention, various product insights may be obtained from the predictive behavior model, including, but not limited to: an up-sell product category, a cross-sell product category, a replenishment days metric, and/or a repeat purchase metric. According to various implementations of the invention, a model of "most likely" customers (i.e., those customers most likely to complete the desired event) may be used to attract new customers with similar characteristics.

As part of training of the predictive behavior model, various implementations of the invention learn a significance of each type of event captured while the user interacts with the client's online presence. For example, if fast converting users tend to come from Facebook, the model will "learn" such behavior and will weight a pageview driven from a Facebook ad as having more significance even if that particular user has never made a purchase. In some implementations of the invention, other types of events, including off-line events (e.g., survey results, etc.), may also be incorporated into the predictive behavior model to predict or otherwise evaluate the likelihood of the desired event occurring (e.g., "purchase intent") that such other types of events signal.

Conventional predictive models typically process inputs such as how many times a user has opened an email or viewed a page in the past month. However, various implementations of the invention also consider a pacing and individual sequencing of those events. In some cases, certain users may signal the strongest intent when such user views a page without a recent email prompting, slightly less intent when the pageview happened hours after a prompt (i.e., user chose to open and react to an email), and less still intent if the pageview happened immediately after a prompt (i.e., user opened an email impulsively). These signals will be different for different clients and different users, particularly for clients built on loyalty to products as opposed to clients built on loyalty to pricing.

According to various implementations of the invention, a predictive behavior model is built based on event data previously generated by user interactions with the client. In some implementations, the predictive behavior model may be evaluated using previously generated events that were not used to develop the model itself (i.e., a subset of the event data held back from the modeling process) to compare predictions provided by the predictive behavior model against what actually occurred. Such implementations assist with understanding how the predictive behavior model performs for new users and/or new scenarios.

While quality of the predictive behavior model is different for every client, the following trends are fairly common across users based on historical data:
1. The likelihood classifier typically has an Area Under Curve "AUC" metric greater than 0.9;
2. The predictive behavior model is biased to have high recall and low precision in order to assist clients with identifying strong candidates to message and not simply to predict the future; and
3. The Mean Average Error of our "Days to Convert" metric is overall around 13 days but more accurate when there's a strong intent signal or the likely conversion is close in time.

Various implementations of the invention are now described in reference to a predictive behavior model referred to as a Time To Next Order model, or "TTNO model." According to various implementations, the TTNO model may include a deep sequential neural network for each of a plurality of clients and based on each client's data, where the data includes, but is not limited to, a customer's interaction with each client's online presence and/or other customer's activities in relation to each client. In some implementations, the deep sequential neural network is trained from scratch.

According to various implementations of the invention, the TTNO model is trained to identify patterns in each client's data regarding the client's customers' interactions with the client's online presence. In some implementations of the invention, the client's data may be time limited to, for example, data occurring within 1 hour, 1 day, 90 days, 180 days, 360 days, or other time limit germane to a typical lifecycle of events for a customer's interaction with the client as would be appreciated. According to various implementations of the invention, event data for each customer may include: a type of event, a time of the event, any client products referenced by the event, a source and medium associated with the event, and/or other events associated with the customer's interaction with the client's online presence. According to various implementations of the invention, the client's data may also include a history of all orders made by each customer of the client, where such history may include a frequency of the order(s), a value of each order(s), an average value of all orders, a cumulative value of all orders, etc.

According to various implementations of the invention, the TTNO model is a deep sequential neural network.
1. Deep: The TTNO model consumes event data that is very close to its raw format and then learns which aspects of the event data are salient to the problem and how best to represent that event data.
2. Sequential: The TTNO model operates on a time series sequence of events as individual related entities instead of as an aggregation.
3. Neural Network: A basic element of the TTNO model is a "neuron" that performs a weighted sum over some set of factors and a non-linear activation on the result. The specific arrangement of neurons (described below) gives the TTNO model its ability to robustly address the general prediction problem and the client specific training data allows the TTNO model to "learn" the weights that make the TTNO model most effective for that client.

Figure 6:
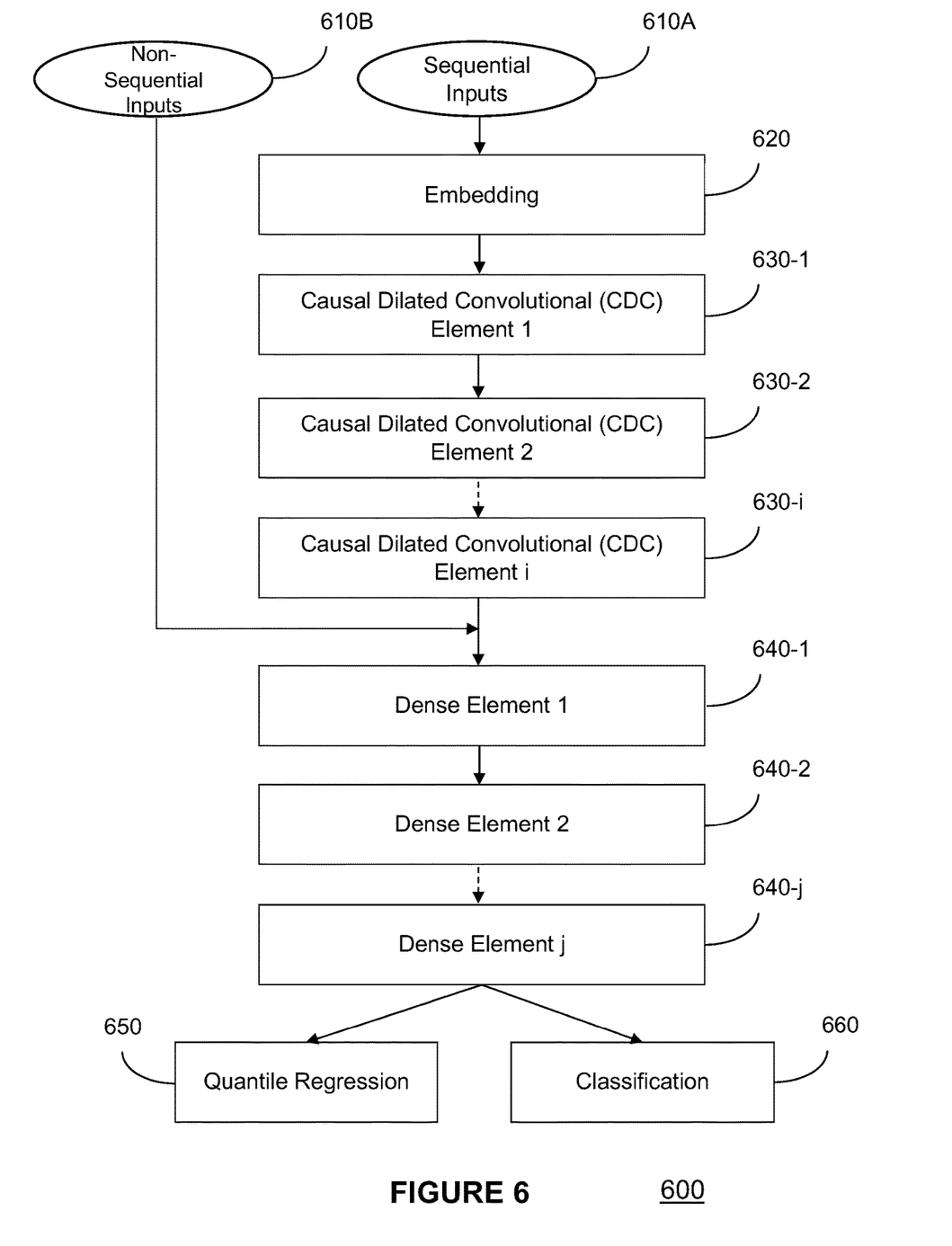
FIG. 6 illustrates a predictive behavioral learning model according to various implementations of the invention.

FIG. 6 illustrates components of a predictive behavior model 600, which is also referred to herein as a TTNO model 600, according to various implementations of the invention. In some implementations of the invention, in an embedding component 620, sequential data 610A is encoded using a learned representation known as an "embedding." In some implementations, this sequential data 610A is referred to as categorical data and may include event type data, product data, source data, etc., and generally includes customer events (i.e., customer interactions with client's online presence). Attributes of individual customer events are embedded into a latent vector space that allows TTNO model 600 to understand how the individual customer events relate to, for example, purchase intent. Embedding allows TTNO model 600 to learn general relationships between entities such as groupings of products that have longer or shorter consideration times as would be appreciated. In some implementations of the invention, an event is decomposed into a set of vectors derived from embeddings and a representation of a timing of that event. The timing signal allows the TTNO model to understand the relative temporal spacing between events. The meaning of the same three events, for example, may change significantly if they are spaced closely in time or distantly in time.

In some implementations of the invention, a sequence of encoded events is processed by a stack of Causal Dilated Convolutional (CDC) elements 630 (illustrated in FIG. 6 as i CDC elements 630 including a CDC element 630-1, a CDC element 630-2, . . . , and a CDC element 630-i). In contrast to traditional approaches of consuming sequences of data using Recurrent Neural Networks (RNN), CDC elements 630 provide various benefits including:

1. Modern processors and GPUs are able to execute convolutions far more efficiently than operations that comprise a RNN;
2. Dilated convolutions allow the TTNO model 600 to efficiently consider much larger sequences of events; and
3. Causal convolutions force the TTNO model 600 to understand and respect the flow of time ordering of the events.

A number i of CDC elements 630 are stacked to the depth necessary to allow TTNO model 600 to "see" a wide enough temporal sequence of events to understand a patterns associated with the desired behavior. This stack of CDC elements 630 collectively forms a pattern detector configured to find interesting signals, including slowly evolving patterns, in the customer events.

In some implementations of the invention, inside each CDC element 630 is a mini-architecture that was inspired by Lea, Colin, et al., "Temporal Convolutional Networks for Action Segmentation and Detection," John Hopkins University, Nov. 16, 2016. Such an architecture of a CDC element 630 is designed to rapidly expand the temporal window over which the TTNO model can detect patterns while being efficient to train and robust to overfitting as would be appreciated.

Figure 7:
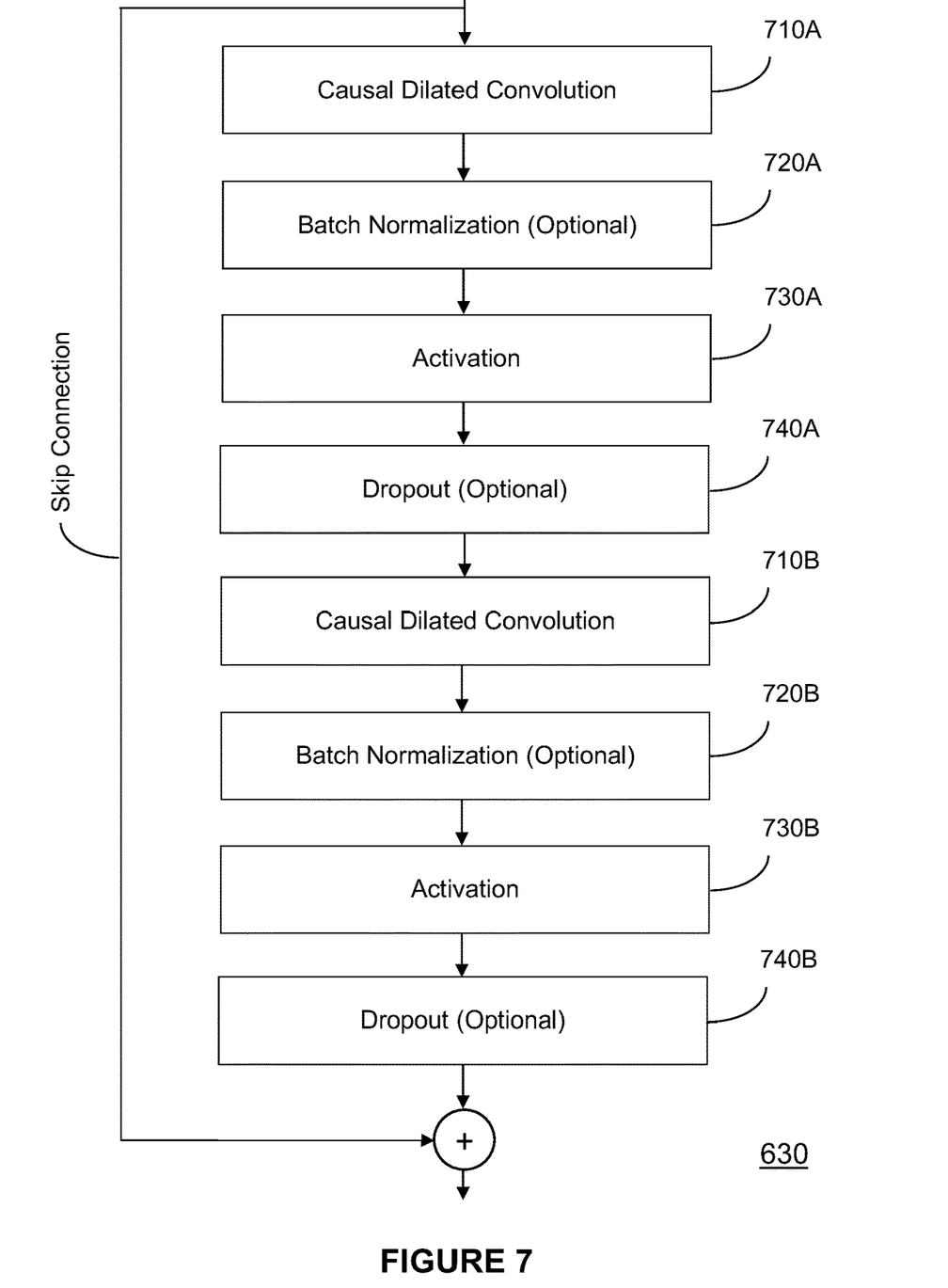
FIG. 7 illustrates a causal dilated convolutional element in further detail according to various implementations of the invention.

FIG. 7 illustrates a CDC element 630 in further detail according to various implementations of the invention. Generally speaking, in various implementations of the invention, CDC element 630 comprises two causal dilated convolutions with some regularization that may be bypassed by a skip connection. In a first convolution component 710A, CDC element 630 applies a first causal dilated convolution to the input to the specific CDC element 630. Causal convolution is a specific configuration of a standard convolutional neural network (CNNs) that is particularly suited to understanding time series data like an event stream as would be appreciated. Causal dilated convolution is a strategy that allows the model to consider a far larger number of events when making a decision than a non-dilated convolution strategy could consider with the same processing constraints as would also be appreciated.

In a first batch normalization component 720A, CDC element 630 applies a batch normalization to the output from first convolution component 710A. Batch normalization is a common technique used to make neural networks learn more efficiently. Batch normalization allows the stacking of many layers, ensuring that lower layers see the same sorts of rich data distributions that allow upper layers to train efficiently as would be appreciated. In some implementations of the invention, this first batch normalization component 720A is optional.

In a first activation component 730A, CDC element 630 applies an activation to the output from first batch normalization component 720A. Activation functions permit neural networks to model non-linear behavior as would be appreciated.

In a first dropout component 740A, CDC element 630 applies a dropout to the output from first activation component 730A. Dropout is a regularization strategy that prevents a model from discovering spurious patterns in the data and over-relying on them for prediction as would be appreciated. In some implementations of the invention, this first dropout component 740A is optional.

In a second convolution component 710B, CDC element 630 applies a second causal dilated convolution to the output from first dropout component 740A. In a second batch normalization component 720B (optional in some implementations), CDC element 630 applies a batch normalization to the output from second convolution component 710B. In a second activation component 730B, CDC element 630 applies an activation to the output from second batch normalization component 720B. In a second dropout component 740B (optional in some implementations), CDC element 630 applies a dropout to the output from second activation component 730B.

Finally, CDC element 630 outputs a combination of the input to the specific CDC element 630 with the output from second dropout component 740B as would be appreciated.

In some implementations of the invention, an output of a final CDC element (i.e., CDC element 630-i) is summarized via "Max Pooling" which collapses the sequence of indeterminate length into a rich fixed-length feature vector representing shopper intent. In some implementations of the invention, this feature vector is then combined with other non-sequential inputs 610B (i.e., customer attributes, etc.), which may include, but are not limited to, a total number of orders, an order frequency, and an average order value, etc.

In some implementations of the invention, the feature vector is then processed by a stack of dense elements 640 (illustrated in FIG. 6 as j dense elements 640 including a dense element 640-1, a dense element 640-2, . . . , and a dense element 640-j) to create an final representation of the event data that will be used for inference.

In some implementations of the invention, each dense element 640 borrows much of the design philosophy of the CDC elements 630. A primary purpose of dense elements 640 is to efficiently form richer representations of the shopper intent feature vector while being efficient to train and robust to overfitting. Dense elements 640 incorporate non-sequential inputs 610B and are stacked to the depth necessary to "understand" complex interactions between signals discovered in sequential inputs 610A by CDC elements 630.

Figure 8:
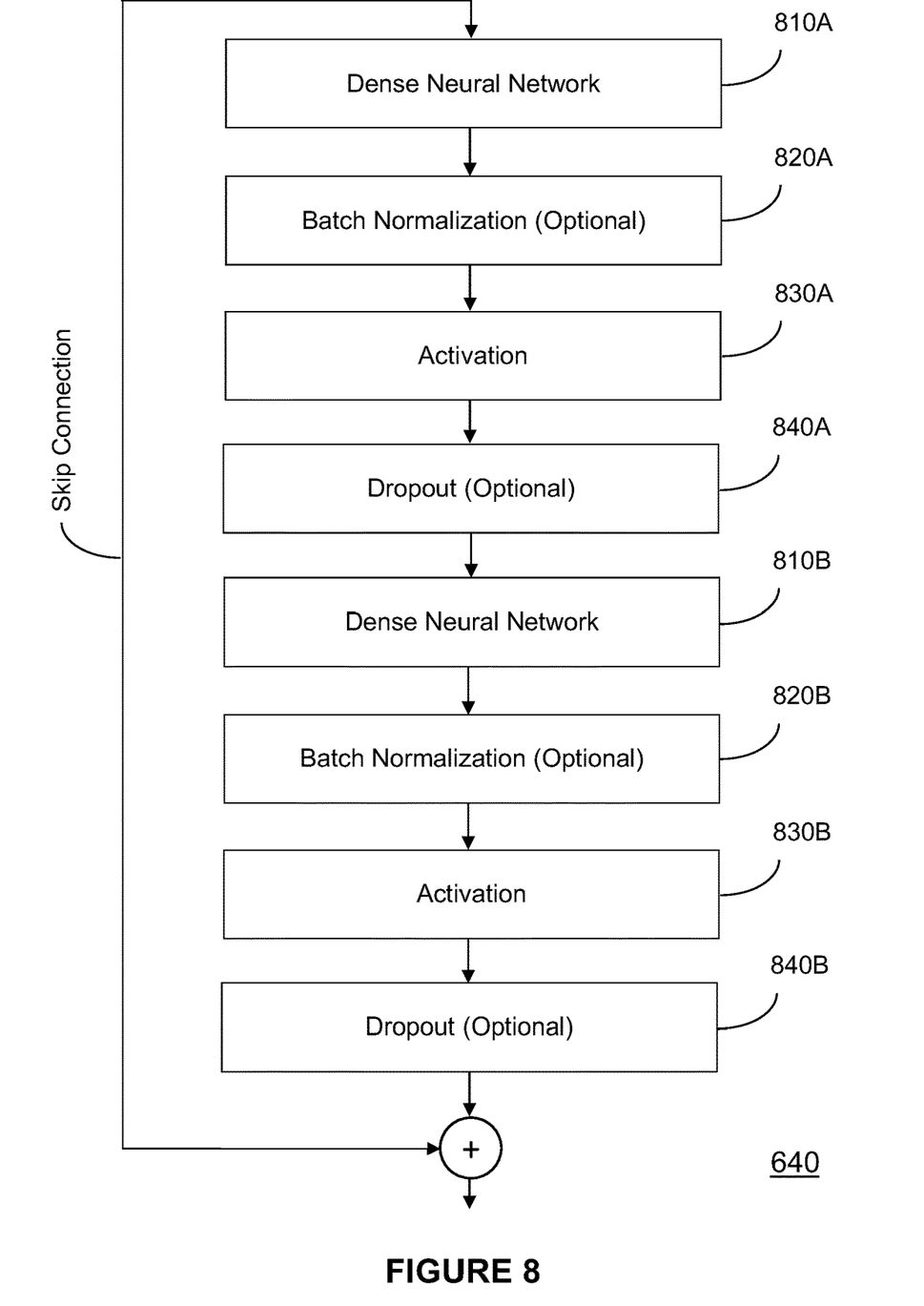
FIG. 8 illustrates a dense element in further detail according to various implementations of the invention.

FIG. 8 illustrates a dense element 640 in further detail according to various implementations of the invention. Generally speaking, in various implementations of the invention, dense element 640 comprises two dense neural networks with some regularization that may be bypassed by a skip connection. In a first dense neural network component 810A, dense element 640 applies a dense neural network to the input to dense neural network 640. Dense neural network component 810 holistically considers temporal features extracted by CDC elements 630. Whereas CDC elements 630 extract information that is tied to particular spans of time (e.g., "the customer spent three hours browsing on Thursday"), dense elements 640 provide an interpretation of that information (e.g., "this means that customer is following its usual idle browsing pattern" or "this means that customer is in market"). In a first batch normalization component 820A (optional in some implementations), dense element 640 applies a batch normalization to the output from dense neural network component 810A. In a first activation component 830A, dense element 640 applies an activation to the output from first batch normalization component 820A. In a first dropout component 840A (optional in some implementations), dense element 640 applies a dropout to the output from first activation component 830A. In a second dense neural network component 810B, dense element 640 applies a dense neural network to the output from first dropout component 840A. In a second batch normalization component 820B (optional in some implementations), dense element 640 applies a batch normalization to the output from dense neural network component 810B. In a second activation component 830B, dense element 640 applies an activation to the output from second batch normalization component 820B. In a second dropout component 840B (optional in some implementations), dense element 640 applies a dropout to the output from second activation component 830B. Finally, dense element 640 outputs the output from second dropout component 840B.

As would be appreciated, batch normalization components 720, 820 and dropout components 740, 840 may be generally referred to as "regularization," and such components may reduce learning required by TTNO model 600. However, earlier components 720A, 740A, 820A, 840A may have less of an impact on training than later components 720B, 740B, 820B, 840B, and as such may not be necessary.

In some implementations of the invention, the stack of dense elements 640 outputs an intent vector that numerically summarizes a nature of the client's customers' intent to purchase. In some implementations of the invention, the output of the stack of dense elements 640 may be consumed by one or more independent layers for final inference. In some implementations of the invention, a first output layer produces a distribution of times over which the next order for a particular customer is expected to occur. In some implementations of the invention, this first output layer is shaped by a loss function that encodes a "quantile regression" objective 650 in order to predict a distribution instead of a single point. In some implementations of the invention, a second output layer performs a simple classification 660 using a traditional sigmoid activation and cross-entropy loss to estimate a likelihood that the customer will purchase within preselected time period (e.g., 6 hours, 6 days, 6 weeks, 6 months, etc.).

In some implementations of the invention, once a time for a next order for the particular customer is determined, a marketing campaign tailored to the particular customer may be developed and executed as would be appreciated. For example, the marketing campaign may try to accelerate a decision for customers that are categorized as likely to purchase by offering them a discount; or the marketing campaign may withhold the discount from customers who are classified as extremely likely to purchase to increase profit margin; or the marketing campaign might avoid expensive retargeting efforts (e.g., through Facebook) to customers that are classified as unlikely to purchase. Other marketing campaigns may be tailored to particular customers as would be appreciated.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as would be understood.

What is claimed is:

1. A system for predicting customer behavior, the system comprising:
   at least one computing processor;
   an embedding component operably configured on the at least one computing processor to receive and embed sequential inputs regarding a plurality of customer interactions of a particular customer with an online presence of a client, wherein the plurality of customer interactions comprise event type data, product data, and source data, wherein each of the plurality of customer interactions further comprise a timing of that interaction;
   a plurality of causal dilated convolutional "CDC" elements arranged in series, wherein the plurality of CDC elements is operably configured on the at least one computing processor to receive the embedded sequential inputs, wherein the plurality of CDC elements is configured to output a feature vector, wherein each of the plurality of CDC elements is configured to consecutively apply: a first causal dilated convolution, a first activation, a second causal dilated convolution, a second activation, and a skip connection that occurs immediately after the second activation, wherein the feature vector represents an intent of the particular customer regarding a particular customer event;
   a plurality of dense neural network elements arranged in series, wherein the plurality of dense neural network elements is operably configured on the at least one computing processor to receive the feature vector and non-sequential inputs regarding a plurality of other customer interactions of the particular customer with the client, wherein the non-sequential inputs comprise a total number of orders, an order frequency, and an average order value, wherein each of the plurality of dense neural network elements is configured to consecutively apply: a first dense neural network, an first activation, a second dense neural network, a second activation, and a skip connection;
   an output generator operably configured on the at least one computing processor to receive the output from the plurality of dense neural network elements and to generate: a distribution of times over which a particular customer event for the particular customer will occur or a likelihood estimation that the particular customer event for the particular customer will occur within a particular time period; and
   a targeted marketing campaign generator configured to send messages or offers to the particular customer based on the distribution of times or the likelihood estimation.

2. The system of claim 1, wherein each of the plurality of CDC elements is further configured to apply a first batch normalization between the first causal dilated convolution and the first activation.

3. The system of claim 1, wherein each of the plurality of CDC elements is further configured to apply a second batch normalization between the second causal dilated convolution and the second activation.

4. The system of claim 1, wherein each of the plurality of dense neural network elements is further configured to apply a first batch normalization between the first dense neural network and the first activation.

5. The system of claim 1, wherein each of the plurality of dense neural network elements is further configured to apply a second batch normalization between the second dense neural network and the second activation.

6. The system of claim 1, wherein each of the plurality of CDC elements is further configured to apply a first dropout between the first activation and the second causal dilated convolution.

7. The system of claim 1, wherein each of the plurality of CDC elements is further configured to apply a second dropout between the second activation and the skip connection.

8. The system of claim 1, wherein each of the plurality of dense neural network elements is further configured to apply a first dropout between the first activation and the second dense neural network.

9. The system of claim 1, wherein each of the plurality of dense neural network elements is further configured to apply a second dropout between the second activation and the skip connection.

10. A system for predicting customer behavior, the system comprising:
- at least one computing processor;
- an embedding component operably configured on the at least one computing processor to receive and embed sequential inputs regarding a plurality of customer interactions of a particular customer with an online presence of a client, wherein the plurality of customer interactions comprise event type data, product data, and source data, wherein each of the plurality of customer interactions further comprise a timing of that interaction;
- a plurality of causal dilated convolutional "CDC" elements arranged in series, wherein the plurality of CDC elements is operably configured on the at least one computing processor to receive the embedded sequential inputs, wherein the plurality of CDC elements is configured to output a feature vector, wherein each CDC element comprises two causal dilated convolutions with regularization that are bypassed with a skip connection, wherein the skip connection occurs immediately before the regularization, wherein the feature vector represents an intent of the particular customer regarding a particular customer event;
- a plurality of dense neural network elements arranged in series, wherein the plurality of dense neural network elements is operably configured on the at least one computing processor to receive the feature vector and non-sequential inputs regarding a plurality of other customer interactions of the particular customer with the client, wherein the non-sequential inputs comprise a total number of orders, an order frequency, and an average order value, wherein each of the plurality of dense neural network elements comprises two dense neural networks with regularization that are bypassed with a skip connection;
- an output generator operably configured on the at least one computing processor to receive the output from the plurality of dense neural network elements and to generate: a distribution of times over which a particular customer event for the particular customer will occur or a likelihood estimation that the particular customer event for the particular customer will occur within a particular time period; and
- a targeted marketing campaign generator configured to send messages or offers to the particular customer based on the distribution of times or the likelihood estimation.

* * * * *